United States Patent

Tadayoshi

[15] 3,675,517
[45] July 11, 1972

[54] ADAPTIVE AND NUMERICAL CONTROL MACHINE TOOL

[72] Inventor: Izumui Tadayoshi, Kawasaki, Japan

[73] Assignee: Tekko Kabushiki Kaisha Ikegai, Tokyo, Japan

[22] Filed: Feb. 19, 1971

[21] Appl. No.: 116,927

[30] Foreign Application Priority Data

Feb. 23, 1970 Japan..................................45/1539
Feb. 23, 1970 Japan..................................45/5396
March 23, 1970 Japan..................................45/24323

[52] U.S. Cl..........................82/2 B, 82/21 B, 82/DIG. 3, 90/13 C, 318/571, 408/11
[51] Int. Cl.........................................................B23b 7/00
[58] Field of Search..............82/2 B, 21 B, DIG. 3; 318/571; 408/11, 12; 90/13 C

[56] References Cited

UNITED STATES PATENTS

| | | | |
|---|---|---|---|
| 3,602,090 | 8/1971 | Whetham | 318/571 |
| 3,573,588 | 4/1971 | Geyer | 82/2 B |
| 3,548,172 | 12/1970 | Centner et al. | 82/DIG. 3 |
| 3,418,025 | 12/1968 | Hucks et al. | 90/13 G X |

*Primary Examiner*—Leonidas Vlachos
*Attorney*—Cushman, Darby & Cushman

[57] ABSTRACT

A numerically controlled machine tool with optimum adaptive control mechanism capable of properly altering the cutting section area and stopping of the cutting operation by self-correction of the commands from pre-arranged reference program upon detection of a signal indicating a cutting force exceeding the reference limits and representing an abnormal pocket pressure and being derived as an electric output from a mechano-electric transducer during continuous checking of the pocket pressures of a hydrostatic bearing which support the cutting force being applied to the cutting tool throughout its cutting operation.

5 Claims, 12 Drawing Figures

ADAPTIVE AND NUMERICAL CONTROL MACHINE TOOL

BACKGROUND OF THE INVENTION

1. Field of the Invention

The present invention is concerned with an improvement in numerically controlled machine tools, and more particularly, it relates to a numerically controlled machine tool with the so-called adaptive control system designed to function so as to properly alter the cutting section area or stop the program instantaneously upon detection of an excess or an insufficiency in the cutting force being applied to the cutting tool throughout its cutting operation and being continuously checked by said system.

2. Description of the Prior Art

Conventional numerically control devices are designed to give out signals to insure that the machine tool equipped with this device will operate by faithfully following a pre-arranged reference program. Therefore, in case there is encountered during the midst of cutting operation an unexpected condition such as an abnormal hardness of the material of the work being cut, an abnormal depth of cut, a damage of the cutting tool and chattering of the cutting tool during its cutting operation, such a conventional numerically control device completely fails to immediately adapt itself to the overcoming of such an unusual condition. On the other hand, a numerically control device with adaptive control system is such that it performs "in process measuring" to continuously check the condition of a particular member or a specific means and to judge the result of said measurement by a discriminating means and to thereby accomplish, whenever necessary, self re-programming of the predetermined reference program. Thus, the numerically control device with adaptive control system materializes cutting operation which effectively utilizes the assigned ability of the machine tool, shortening of the part program and the lessening of the work load of the operators.

It is the accepted idea of an adaptive control of a numerically controlled machine tool that it becomes feasible when factors, such as the objective to be detected, the type of the detecting means to be used, the objective to be detected, the correction parameters and the correction formulas, are defined. In the past, there have been made a number of proposals each aiming to accomplish various objects such as improvement of the cutting efficiency, lessening of the work load of the operators, shortening of the programs, proper control of dimensions, improvement of the quality of works being processed, and protection of not only machines, tools, but also works to be processed.

Known examples of adaptive control mechanisms for numerically controlled cutting machines include; those designed to detect changes in the cutting torque and/or deflection of the spindle of a milling cutter to thereby alter the feed rate of the cutting tool; those designed to detect the rotation torque of the spindle of a lathe to thereby change the cutting section area; and those designed to detect the driving power of a lathe spindle to modify the feed rate of the cutting tool.

These known adaptive control mechanisms employed the following means as the detecting means — such as a strain meter, a differential transformer type micrometer, a torque meter, and the like. However, none of them was found necessarily satisfactory from the viewpoints such as easy handling and sensitivity or responsiveness.

SUMMARY OF THE INVENTION

The concept of the aforesaid adaptive control implies not only the proper alteration of the cutting section area by detecting the magnitude of the cutting force but also the capability of interrupting the programmed cycle by detecting an abnormal condition or damage of the cutting tool during continuous checking of the fluctuation of the cutting force by the adaptive control mechanism.

It is an object of the present invention to provide an improved numerically controlled machine tool having adaptive control system, which functions so as to detect — from a change in the pressure of any particular pocket of a hydrostatic bearing which is a structural element of the machine tool — a component force, in a specific direction, of the cutting force applied to the cutting tool, and to compare the value of this detected component force with the predetermined reference limits, and to utilize this result of comparison to effect, within the control system, and to self re-programm of the contents of the pre-arranged numerical control program, and to deliver the corrected command signal for the machine tool itself.

Another object of the present invention is to protect not only the cutting tools, the machine tools themselves, but also the works being processed, by the arrangement which functions so that whenever a cutting force exceeding the critical value or an abnormal sharp change in the cutting force is detected during the continuous checking performed throughout the cutting operation, the contents of the reference numerical control program is self re-programmed automatically and commanded.

Still another object of the present invention is to materialize simplification of part programming and to lessen the work load of the operators by effectively utilizing — through adaptive control system — the mechanical ability of the machine tool itself which is in use.

The features of the present invention which aims to attain these objects are found in a numerically controlled machine tool having adaptive control system comprising a hydrostatic bearing which is one of the indispensable structural elements thereof and which, in fact, serves as the means for detecting the cutting force which is being applied to the cutting tool, and in the functional arrangement of the system which is operative so as to derive — as an electric output from a mechano-electric (pressure to electricity) transducer — a change in any particular pocket pressure of said hydrostatic bearing caused by an abnormal cutting force applied to this pocket and to introduce this output into an computating unit as an input of the latter and to have this unit compare it with the predetermined limiting conditions so that, whenever necessary, the contents of the reference numerical control program are adaptively corrected and that this corrected command signal is generated to effect an alteration of the cutting section area.

DETAILED DESCRIPTION OF THE PREFERRED EMBODIMENTS

The first embodiment of the present invention represents a numerically controlled machine tool having adaptive control system arranged so that the pressures of the recessed pockets formed — in a hydrostatic bearing — in the bearing surface of a sliding table for supporting the cutting force are the object to be detected. This numerically controlled machine tool with adaptive control mechanism comprises a first means which is a sliding table to which a cutting tool is secured and which is driven in accordance with a numerical control command signal, a second means which is a hydrostatic bearing assembly equipped with recessed pockets formed in said sliding table, orifices and a hydraulic pressure source, a third means consisting of means for detecting the aforesaid pocket pressures, discriminating means capable of delivering a correction signal for the reference program compare said detected pressure with predetermined limit condition, and a numerically controlling means which, while correcting the reference program based on said correction signal, driven said sliding table according said corrected numerical control program.

Figure 1:
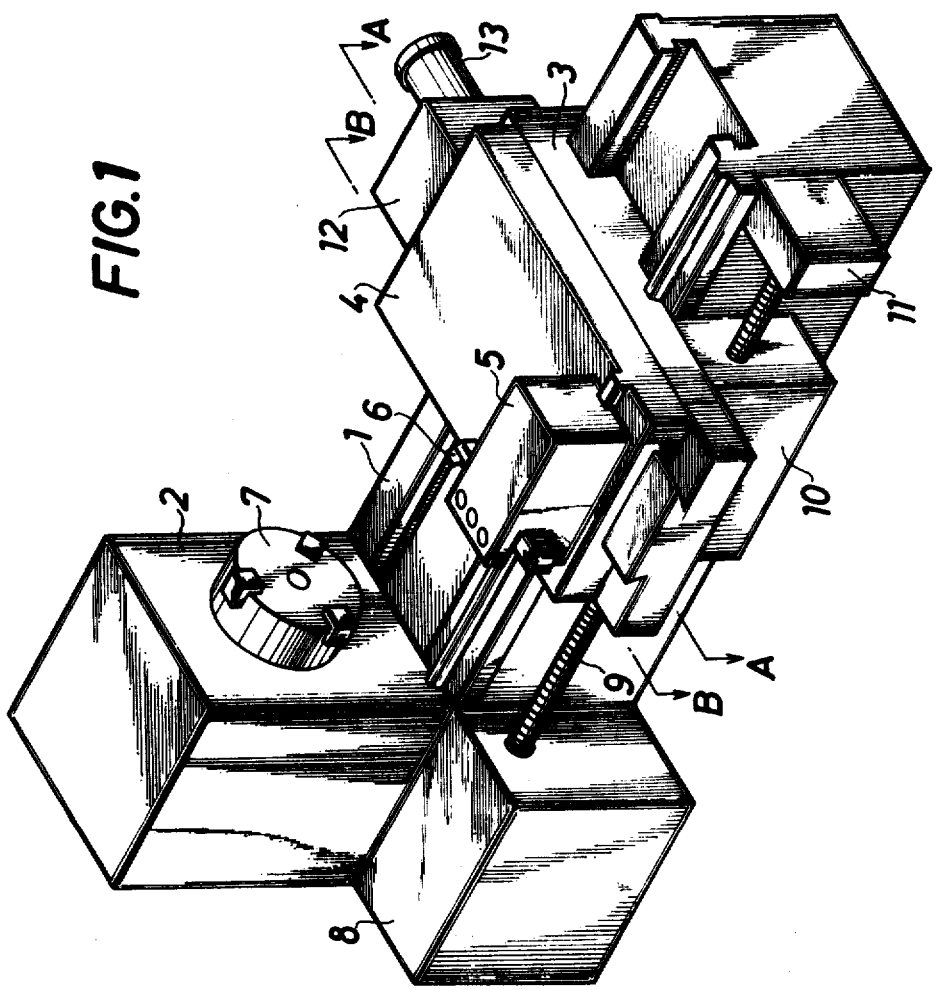
FIG. 1 is a perspective view of the first embodiment of the present invention.

FIG. 1 is a perspective view of a numerically controlled lathe which represents this first embodiment and comprises a bed 1, a spindle head 2, a longitudinal saddle 3, a cross-slide 4, a cutting tool holder 5, a cutting tool 6, a chuck 7, a longitudinal feed screw 9, an apron 10, an end bracket 8, a crossfeed bracket 12, and a crossfeed electric motor 13. Description of the structural relations and the actions of these individual members, however, is omitted in view of no particular difference from those of an ordinary lathe.

Figure 2:
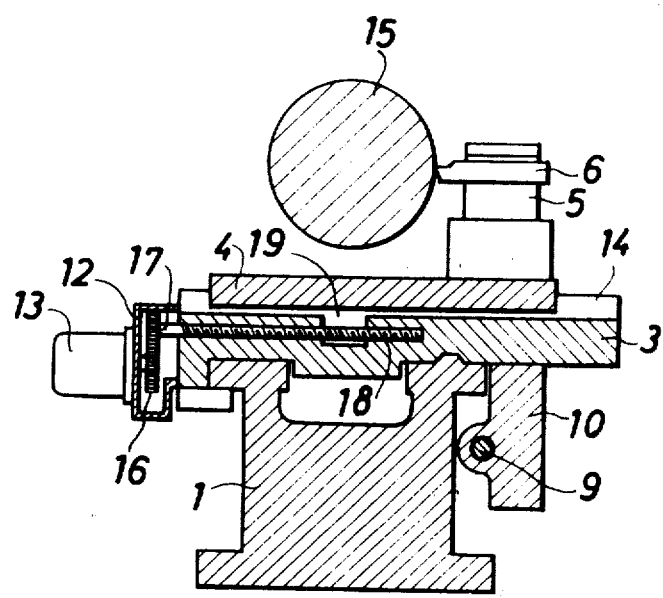
FIG. 2 is a sectional view taken along the line A—A in FIG. 1.

FIG. 2 is a sectional view taken along the line A—A in FIG. 1, which is illustrated for the explanation of the driving mechanism of the crossfeed table. This cross-slide 4 is caused to slide on the longitudinal saddle 3 as it is guided by a dovetail guide member 14 of the longitudinal saddle 3 to thereby cause the cutting tool 6 to be displaced toward its cross direction. This displacement is effected — via a gear 16, 17, a feed screw 18 and a nut 19 — by the electric motor 13 which, in turn, is driven from a numerically controlling means which will be discussed later in further detail.

Figure 3:
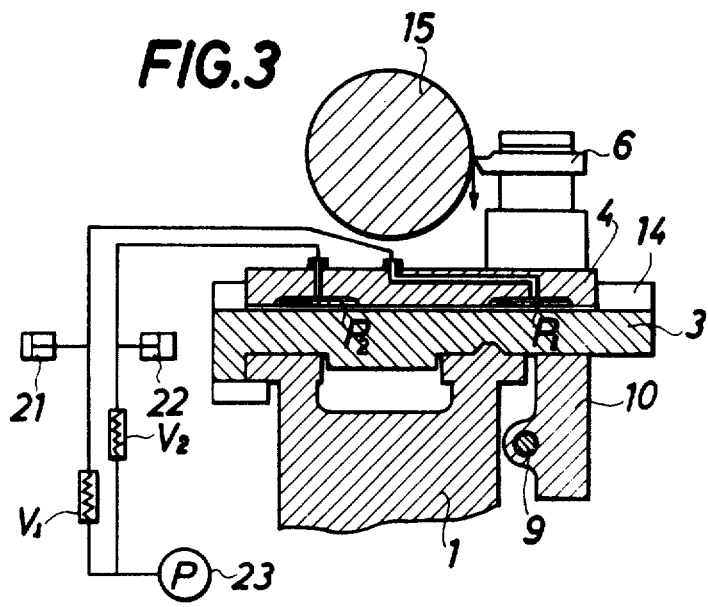
FIG. 3 is a sectional view taken along the line B—B in FIG. 1.
Figure 4:
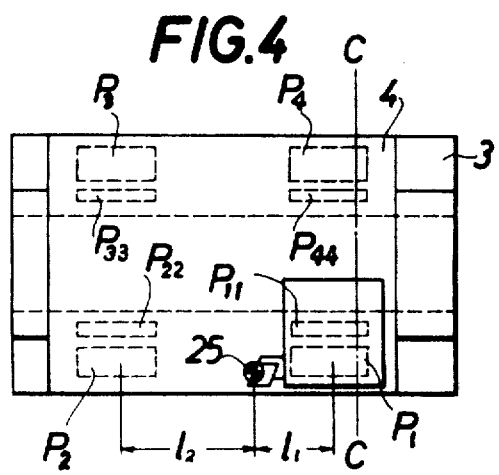
FIG. 4 is a top plan view of a feed table.
Figure 5:
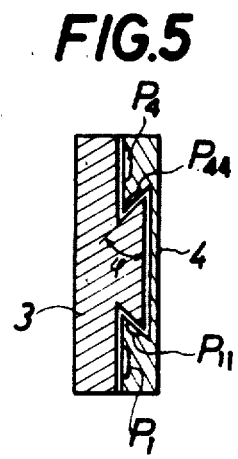
FIG. 5 is a sectional view taken along the line C—C in FIG. 4.

FIGS. 3, 4 and 5 illustrate the manner in which the recessed pockets of the hydrostatic bearing are formed in spaced relations in the cross-slide 4 which is adapted to slide on the longitudinal saddle 3 as it is guided by the dovetail guide member 14. More specifically, pockets $P_1$, $P_2$, $P_3$ and $P_4$ are formed in spaced relations in the horizontally slidable surface. Furthermore, pockets $P_{11}$, $P_{22}$, $P_{33}$ and $P_{44}$ are provided in spaced relations in the obliquely slideable surface. The pocket $P_1$ is connected via an orifice $V_1$ to a hydraulic pressure source 23, and the pocket $P_2$ is connected via an orifice $V_2$ to the same source 23. By this hydrostatic bearing assembly having the aforesaid arrangement, the cross-slide 4 is supported hydrostatically on the longitudinal saddle 3. A work 15 is cut by the cutting tool 6 whose cutting force acts at the tip of the tool in the direction of the arrow. Let us now assume that the vertical component of the cutting force is indicated by $F_T$ and that the point at which the action of the cutting force is applied to the cross-slide 4 is positioned at the point 25 directly below the tip of the cutting tool as shown in FIG. 4. This point 25, however, remains stationary until the cutting tool is replaced. Hence, the following equation is obtained:

$$F_T = K_1 \cdot \Delta P_1 \quad (1)$$

wherein:

$K_1$ represents a rate constant, and $P_1$ represents a incremental change in the pocket pressure caused by the cutting force as it becomes to be applied to the cutting tool from its non-loaded condition.

More specifically, Equation (1) shows the fact that, for any selected cutting tool it is sufficient through continuous checking for any one of the pockets. Let us now assume, in Equation (1), that the distance between the point 25 and the center of the pocket $P_1$ is $l_1$ and that the distance between the point 25 and the center of the pocket $P_2$ is $l_2$. Then, the aforesaid equation will become:

$$F_T = (K \cdot \Delta P_1 \cdot S_1 (l_1 + l_2)/l_2) \quad (2)$$

Wherein:

$K$ represents a rate constant, and $S_1$ represents the effective area of the pocket $P_1$.

Generally speaking, however, it would be desirable to perform indirect measurement of cutting force by detecting as many pocket pressures as possible by taking into account the possible changes which could occur in the position of the tip of the cutting tool and the possible changes which could take place in the direction of the main component of cutting force, both of which being due to replacement of the cutting tool.

Thus, by detecting the changes in all of the pocket pressures of the cross-slide 4 supported by pockets of $n$ in number, the following equation is obtained;

$$F_T = \sum_{i=i}^{n} C_i \cdot S_i \cdot \Delta P_i \quad (3)$$

wherein: $C_i$ represents a rate constant.

Figure 6:
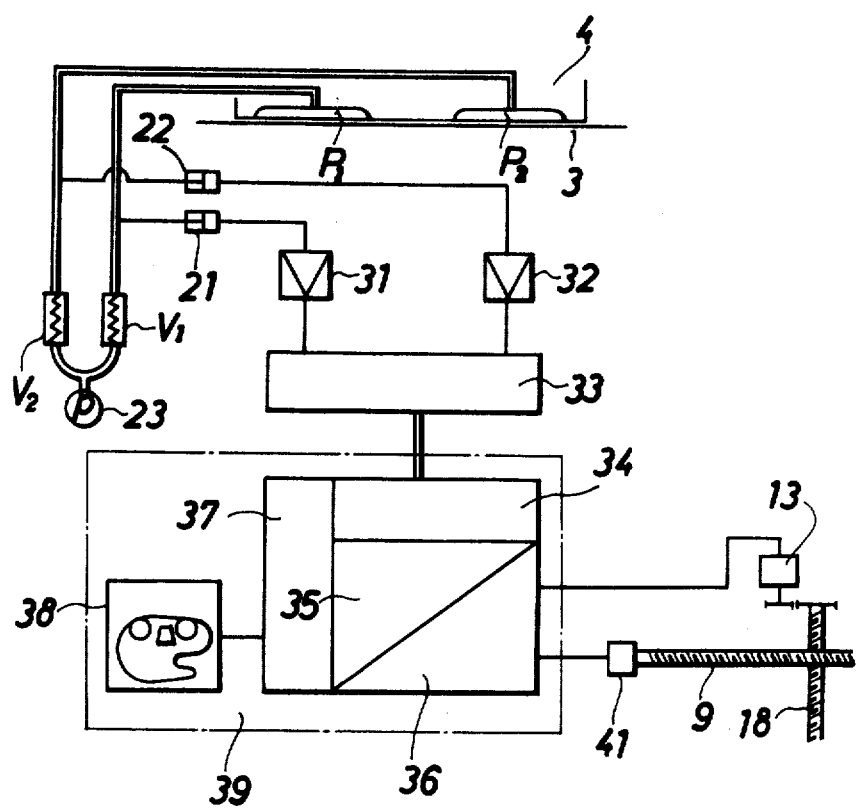
FIG. 6 is a block diagram, briefly illustrating the entire arrangement of said first embodiment.

This embodiment is of a superior advantage particularly in that the relationship between the position of the tip of the cutting tool and the site at which the cutting force is measured is always constant. This permits the cutting force to be checked without being affected at all by the changes in the diameter and the length of the work to be processed. Thus, this embodiment provides an advantage which is not obtained from the prior method designed to perform indirect measurement of the cutting force from such factors as the torque applied to the spindle or the consumed power of the motor for driving the spindle. As shown in FIGS. 3 and 6, in the instant embodiment, there are connected mechano-electric transducer 21 and 22 — each comprising a semiconductor element — to the pockets $P_1$ and $P_2$, respectively, for detecting the pocket pressures and for conversion of the detected pressures to electric outputs, on the assumption that the replaced cutting tool is not accompanied by any change in the position of the tip of the cutting tool from the line L which connects the respective centers of the pockets $P_1$ and $P_2$.

FIG. 6 is a schematic diagram showing the manner in which the aforesaid hydrostatic bearing assembly is connected to the numerically control unit. Specifically speaking, the hydrostatic bearing is connected — from said pockets $P_1$ and $P_2$ of the cross-slide 4 and via the orifices $V_1$ and $V_2$ — to an oil pressure source 23. These pocket pressures are detected by said mechano-electric transducer 21 and 22, respectively, and are thereby converted to electric outputs which, in turn, are amplified by amplifiers 31 and 32, respectively, and transmitted to a computation controller 33. This computation controller 33 performs the following arithmetic discriminations.

1. Arithmetic discrimination of limits of cutting force

Let us assume that the maximum cutting force which is allowed for the individual cutting tool arranged by the tool call command of a numerically control machine tool is $F_{max}$ and that the minimum cutting force is $F_{min}$. The computation controller performs a comparison of this maximum or minimum cutting force with the reference $F_T$ of Equation (3). If $$F_{max} \leq F_T = \sum_{i=i}^{2} C_i \cdot S_i \cdot \Delta P_i \quad (4)$$

or if $$F_{min} \geq F_T \quad (5),$$

the computation controller 33 generates a program correction signal in accordance with a program modifying system which will be described later.

2. Discrimination of differential value of cutting force

Whenever a damage of the cutting tool, or a hitting of the cutting tool against the work due to a quick feed of the tool, or chattering of the cutting tool curing its cutting action, or a play in the holder of the work or the tool arises, there is noted a sudden change in the pocket pressures. Accordingly, if the value of $\theta$ in the equation:

$$\theta = d(F_T)/dt \qquad (6).$$

exceeds a predetermined level, the computation controller 33 gives out a signal for stopping the feed of the cutting tool.

A numerically controlling unit 39 comprises; a decoding and storing means 37 capable of decoding and storing the aforesaid predetermined reference program which is read by a tape reader 38; a pulse interporater 35; a feed rate controller 34 for controlling the feed rate of the cutting; and an output controller 36 assigned for controlling the driving output.

The numerically control unit 39 is assigned for controlling the electric motors 13 and 14 and for controlling thereby the direction of displacement of the cutting tool, the distance of such a displacement and the velocity of this displacement via the feed screws 18 and 9. In the instant embodiment, an open loop system which utilizes to say that a closed loop system which comprises a position detector provided at the end of each feed screw may be employed instead of the open loop system.

When the actuated computation controller 33 reveals the fact that the cutting tool, assembly is subjected to an excessive or an insufficient cutting force owing to a cause not anticipated from the reference program, or the fact that the value of $\theta$ in Equation (6) assumes a level in excess of the predetermine level, the computation controller 33 gives out, simultaneously therewith, a program correction signal to cause the numerically controlling unit 39 to effect the correction of the reference program in accordance with the correction system which will be discussed later. As a result, the motors 13 and 14 act so as to relieve this inadequate cutting condition, so that the subsequent cutting operation is performed under suitable cutting conditions.

The aforesaid system for correcting the reference program includes the following types of conditions:

a. making a decrease in the feed rate of the cutting tool in accordance with the predetermined correction rate, b. making an increase in the feed rate of the cutting tool in accordance with the predetermined correction rate, c. making a reduction of cutting depth in accordance with the predetermined correction rate, and d. effecting unconditional stopping of the feed.

In a cutting operation which is performed by the use of a single-tipped cutting tool, the main cutting force is represented by:

Cutting section area (=chip width × thickness of chip). Therefore, the aforesaid conditions (a), (b) and (c) may be summarized by the expression which is to "alter the cutting section area."

It should be understood, however, that making an increase in the amount of cutting depth simply because an insufficient cutting force has been detected should not be adopted in view of the possibility that a required shaping of work is not acquired.

It should be understood also that when the cutting is effected after a reduction of the amount of cutting depth, the required shaping of work can be attained by repeating the process of the relevant command block of the program or by repeating the process of the entire reference program.

As will be understood from the foregoing statement, according to the present embodiment, it becomes possible to increase or decrease the feed rate so as to fit the unexpected conditions which cannot be anticipated from the reference program, or to interrupt the feed of the cutting tool to protect it or the work being out, or to improve the cutting efficiency to lessen the work load of the operators required for the preparation and supervision or vigilance of the processing operation. The unique detecting method of this instant embodiment is of the advantages: (i) that the cutting force can be measured without being affected by the difference in the diameter, length and shape of the works to be processed, (ii) that a precision detection can be performed at a predetermined position close to the cutting tool without hampering the cutting operation and without being affected by the chips, heat or the like which are produced during the cutting operation, (iii) that the cutting force of the replaced cutting tool can be detected without requiring adjustment of any kind, and (iv) that this embodiment can be applied in common to various other types of processing operations such as outer turning, grooving, and cutoff operation.

A first embodiment has been described in connection with the instance where the present invention is applied to a numerically controlled lathe. However, by arranging so that the detection of cutting force may be made by utilizing the pressures in the recessed pockets formed in the bottom face of the table to which the work is attached, it becomes possible to substantially equally effectively apply this embodiment to other types of machine tools such as milling machine and boring machine.

Figure 7:
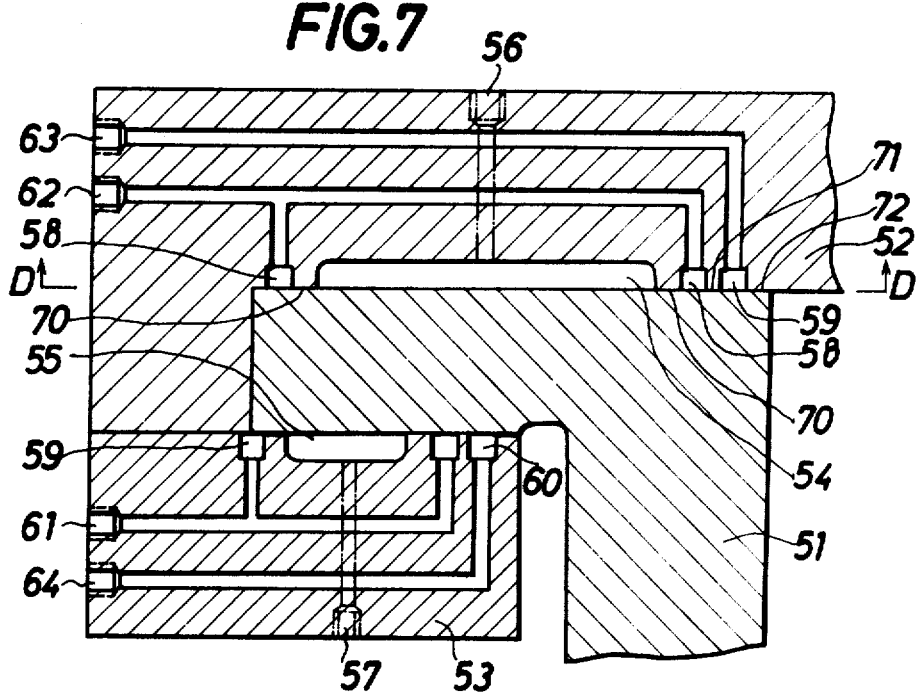
FIG. 7 is a sectional view of a pocket of a hydrostatic bearing assembly employed in the second embodiment.
Figure 8:
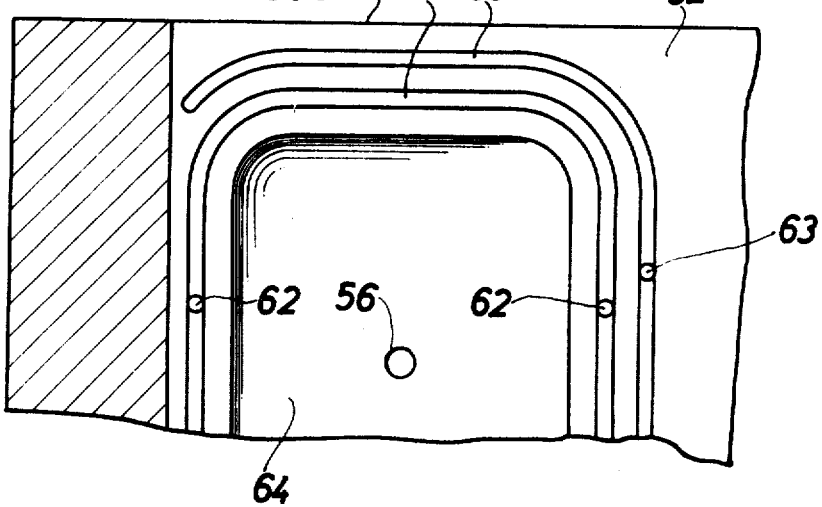
FIG. 8 is a view in the direction of the arrows D—D in FIG. 7.

FIGS. 7 and 8 show the details of the hydrostatic bearing portion for use in the second embodiment. This arrangement is intended to prevent the leakage of the lubricating oil and the intrusion of foreign bodies externally thereof. A slider face 51 guides a table 52, and a back plate 53 can move integrally with said table 52 in tight contact therewith. A recessed pocket 54 is formed in the lower face of the table 52. A port 56 is connected, via an orifice not shown to an oil pressure source. A discharge groove 58 is provided along the external circumference of the pocket 54. The discharged oil is returned to the oil pressure source through a conduit 62. Another port 57 is provided for the recessed pocket 55 which is formed in the back plate 53. This port 57 is connected via another orifice not shown to the oil pressure source. A discharge groove 59 is provided around the pocket 55. The discharged oil from this pocket 55 is sent back to the oil tank through a conduit 61. The arrangement of the pocket 54 and the discharge groove 58 is as shown in FIG. 8. A pressurized gas passageway 59 is disposed between the discharge groove 58 and the external edge 65 of the bearing in the manner as illustrated. This passageway 59 communicates via a port 63 to a compressed gas source not shown. The behavior of this hydrostatic bearing is as follows. The oil which is supplied to the pocket 54 passes through a gap 70 which is the portion defined by the pocket 54 and the discharge groove 58, and is introduced into the discharge groove 58. The conduit 62 is usually connected directly to the oil tank, but it may be connected thereto via a suction means as the occasion requires. Since the pressurized gas contained in the pressurized gas passageway 59 extends into an external gap 71 which is provided externally of the discharge groove 58, the oil discharged from the pocket 54 is forced back to the discharge groove 58, and thus it never leaks to the outside of the bearing system. At the same time, this forced-back oil elevates the "water head" for returning the discharged oil to the oil tank. Also, the gap 72 which is provided externally of the pressurized gas passageway 59 serves to hold the pressure in the said passageway 59, and concurrently it serves to cause the leakage of some of the gas to the outside of the bearing system to form a gas stream which, in turn, prevents the intrusion of foreign particles.

Figure 11:
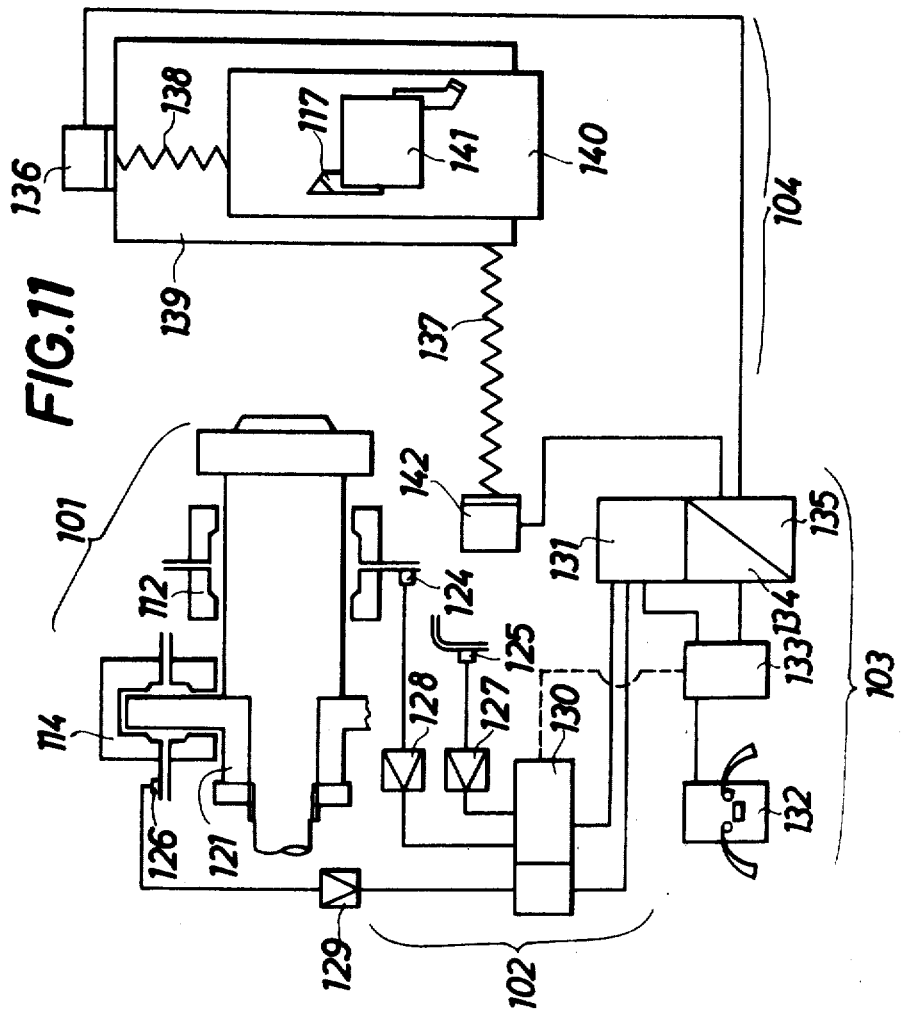
FIG. 11 is a block diagram, briefly illustrating the entire arrangement of a third embodiment.

The third embodiment is applied to a numerically controlled lathe arranged so as to support, by a hydrostatic bearing, the spindle which is rotated while supporting a work, wherein the pocket pressures of this hydrostatic bearing are the object to be detected to provide a numerical control lathe having adaptive control system. In FIG. 11, there are shown a first means which is a spindle means 101 supported by a hydrostatic bearing, a second means which is a means 102 for detecting the pressures of the hydrostatic bearing pockets and for performing thereby the required mechano-electric conversion and for delivering a correction command to correct the reference program, a third means is a numerical control device 103 which is delivering the digital command of cutting operation to the machine tool in accordance with the reference numerical control program and which is assigned for correcting the contents of the reference numerical control program by virtue of the aforesaid correction command received and for delivering digital command of the corrected program, and a fourth means which is a cutting tool driving means 104 for driving the cutting tool in accordance with the contents of the latter command received from said control means 103. These four means are essential elements for this third embodiment.

Figure 9:
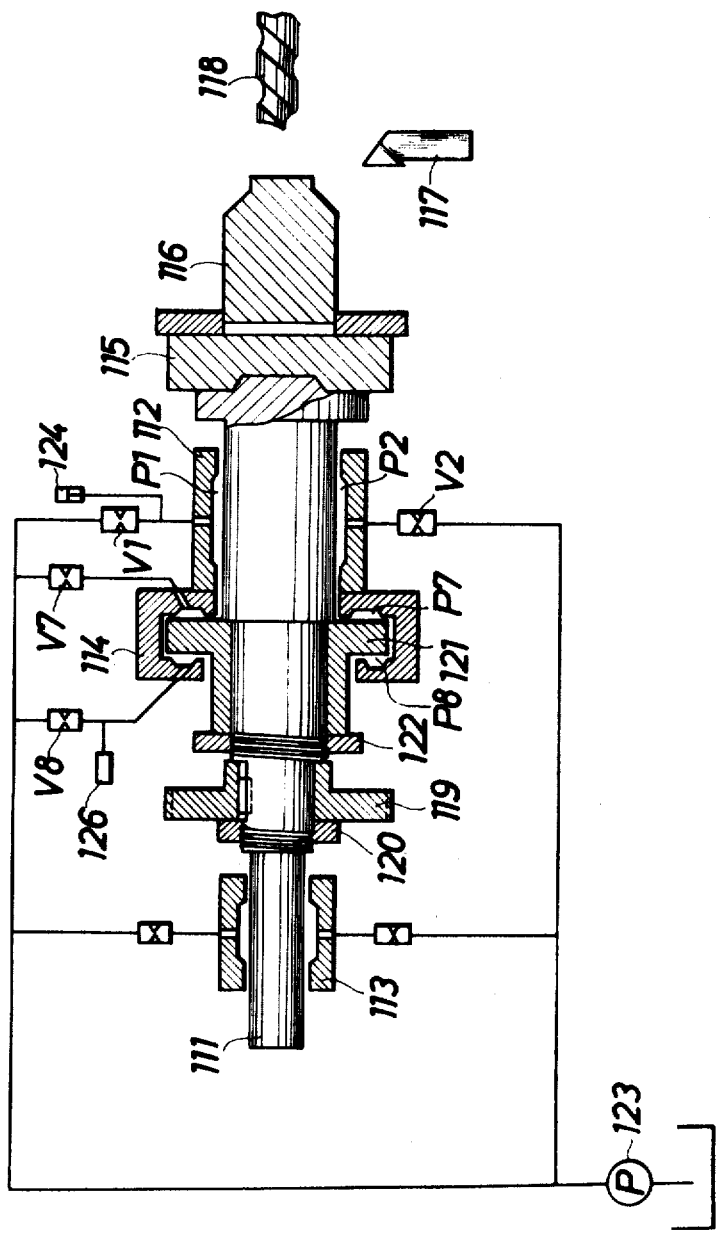
FIG. 9 is a side view, partly in section, of the main spindle assembly employed in the third embodiment of the invention.
Figure 10:
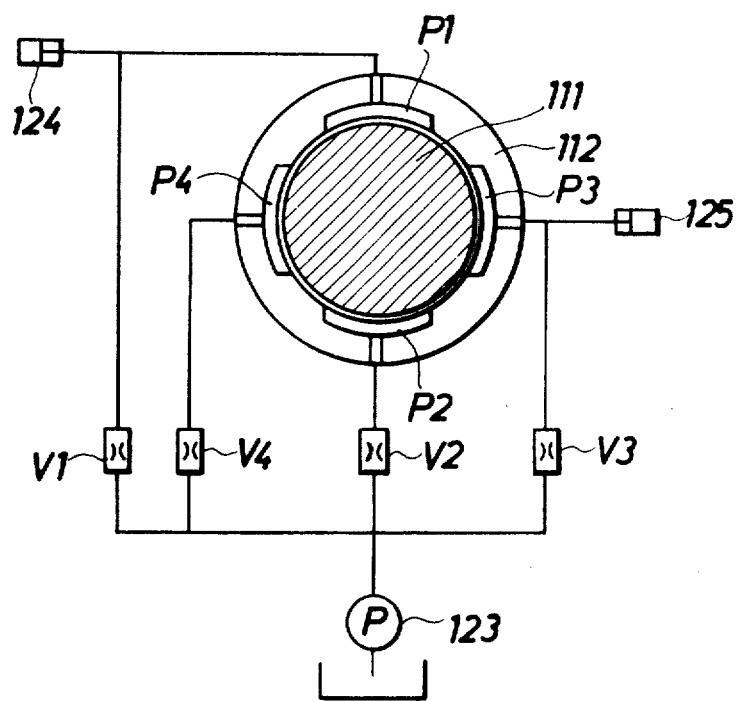
FIG. 10 is a sectional view perpendicular to the spindle of the front hydrostatic bearing.

The detail of the spindle means 101 is shown in FIG. 9. A spindle 111 is supported by a front hydrostatic bearing 112, a rear hydrostatic bearing 113 and a hydrostatic thrust bearing 114. A chuck 115 is mounted at the front end of the spindle 111. A work 116 is clamped by said chuck 115 ready for being processed by a turning tool 117 and a twist drill 118. A gear 119 for driving this spindle is arranged so that the driving force is transmitted thereto from a driving means not shown but secured to the spindle. A thrust collar 121 is secured to the spindle 111 by means of a nut 122 to transmit the thrust force of the spindle to the hydrostatic thrust bearing 114. The cross section of the front hydrostatic bearing 112 perpendicular to the spindle is provided with four recessed pockets $P_1$, $P_2$, $P_3$ and $P_4$ which are formed in its inner periphery as shown in FIG. 10. These pockets communicate with the external side of their ports. The respective ports are connected via orifices $V_1$, $V_2$, $V_3$ and $V_4$ to an oil pressure source 123, respectively. The opposing pockets $P_1$ and $P_2$ as a pair and those $P_3$ and $P_4$ as another pair are balanced in pressure relative to each other in each pair with a difference in pressure corresponding to the external force applied to the spindle 111. As a result, this spindle 111 is held in place by virtue of oil films in non-contacting condition relative to the bearing body 112. Accordingly, the amount of change, $\overline{\Delta W}$, of the external force vector is divided into two orthogonal components. Variation of the vertical component is observed as the variation of the pressure of the pocket $P_1$, whereas the variation of the horizontal component is observed as the variation of the pressure of the pocket $P_3$. In order to obtain the pocket pressures as electric outputs, therefore, transducers 124 and 125 are connected to the pockets $P_1$ and $P_3$, respectively, as illustrated. The rear hydrostatic bearing 113 is of a structure which is substantially equal to that shown in FIG. 10. In the instant embodiment, however, there is used no mechano-electric transducer for this rear bearing. The rear hydrostatic bearing 113 receives the turning force moment applied to the spindle and is subjected to a load in a direction opposite to that of the load received by the front hydrostatic bearing 112. In this embodiment, the detection of the cutting force is accomplished by the front bearing 112 alone. The rear hydrostatic bearing 113 is not provided with any pressure detecting means. However, as will be stated later, it is capable of being acquainted with the distance $l$ between the front bearing 112 and the tip of cutting tool by virtue of the contents of the numerical control program, and also capable of compensating for the difference between the result of detection and the true cutting force required. Let us now assume that the cutting force is indicated by W, the distance between the bearing by L, the magnitude of the load vector by B, the deviations of the pocket pressures by $P_1$ and $P_3$, and the effective projected area of the bearing by S, there will be obtained the following relations:

$$W = \frac{BL}{(L+l)} \qquad (7)$$

$$B = |\sqrt{(K_1 \cdot \Delta P_1)^2 + (K_2 \cdot \Delta P_3)^2}| \qquad (8)$$

wherein: $K_1$ and $K_2$ represent rate constants.

The hydrostatic thrust bearing 114 is constructed so that its two bearing faces oppose to each other, with the thrust-receiving faces of the thrust collar 121 being sandwiched between these two bearing faces. These bearing faces are provided with annular recessed pockets $P_7$ and $P_8$, respectively. Their ports which extend to the external sides of the pockets, respectively, are connected to the oil pressure source 123 via orifices $V_7$ and $V_8$, respectively. The aforesaid opposing pockets $P_7$ and $P_8$ are rendered in balanced state relative to each other with a difference in pressure corresponding to the thrust force applied to the spindle 111. The thrust collar 121 is held in non-contacting state relative to the bearing body 114 via oil films. Therefore, the variation in the force of action exerted by the twist drilling tool 118 or by the turning tool 117 in the direction of thrust is observed as the variation of the pressure of the pocket $P_8$.

Whereupon, in order to obtain the pocket pressure of $P_8$ as an electric output, a transducer 126 is connected to the pocket $P_8$ in the manner as shown. This converter 126 is similar in construction to those transducer 124 and 125 which are used in the observation of the pocket pressures of the front hydrostatic bearing 112. More specifically, a commercially available transducer having a mechano-electric converting means made of a semiconductor device and being incorporated in the pressure chamber is employed as the transducer 126. The second means— which is intended for sensing and detecting the variation of pressure as the variation of cutting force — comprises the aforesaid transducer 124 and an amplifier 128 both of which are assigned for detecting a vertical component force; the previously said transducer 125 and an amplifier 127 for detecting a horizontal component force; and the above-mentioned transducer 126 and an amplifier 129 for detecting a thrust force.

An computing unit 130 performs the following arithmetic discriminations by utilizing the inputs from the aforesaid respective amplifiers 127, 128 and 129.

1. Computation and discrimination of the limits of cutting force

Assuming now that the maximum allowable main cutting force of cutting tool which is arranged by the tool-call command of a numerically controlled machine tool is expressed by $F_{max}$, and that the minimum main cutting force by $F_{min}$, these two cutting forces are compared with the value obtained from the previously shown Equation (7). In case the comparison presents either one of the following results, namely:

$$F_{max} \leq W \qquad (9)$$

or if $$F_{min} \geq W \qquad (10),$$

there is generated a correction command for correcting the program.

2. Discrimination of the differential value of cutting force

Where there occurs a damage in the cutting tool or a pumping of the cutting tool against the work during quich approach or chattering of the tool during its cutting action, or when there is present a play in the holding means of the work and/or the cutting tool, there will be noted a sudden sharp change in the pocket pressures. Accordingly, when the value of $\theta$ in the equation:

$$\theta = d(W)/dt \qquad (11)$$

exceeds a predetermined level, the arithmetic unit 130 gives out a command signal for stipping the feed of the cutting tool.

In order to effect the aforesaid two types of arithmetic operations, the computing unit 130 has the following means, i.e.: a resistor for storing the value of a constant representing the condition under which the spindle 111 actually is not subjected to any cutting force at all; a computer circuit for computing the total cutting force vector from the three component forces, namely, horizontal component force of cutting, vertical component force of cutting and thrust; a correction circuit for effecting necessary correction of the detected value based on the information — received from the numerical control program — dealing with the distance between the tip of the cutting tool and the front hydrostatic bearing 112; and a comparison circuit for comparing the limiting conditions of cutting force and the load applied. This arithmetic unit 130 functions in such a way that, whenever the cutting tool system departs from the limits imposed on the cutting force due to causes not anticipated from the reference program, or whenever the value of $\theta$ of the Equation (11) is noted to exceed a predetermined level, the computing unit 130 instantaneously gives out a program correction command signal to the numerical control unit 103 to have this unit 103 effect the correction of the reference program.

The numerical control unit which represents the third means comprises a tape reader 132, a decoding and storing means 133, a pulse interpolater 134, a feed rate controller 131 and an output circuit 135.

Where no program correction command signal is delivered from the aforesaid correction commanding means 102, the tape reader 132 reads the contents of the original reference program and supplies an output to the feed driving means so that the cutting tool is moved to follow a assigned tool path and a feed rate both of which are as prescribed in the original reference program. However, when a program correction command signal is generated from the correction commanding means 102, the reference program is corrected in accordance with one of the program correction references as listed below:

a. making a decrease in the feed rate in accordance with the predetermined correction rate;

b. making an increase in the feed rate in accordance with the predetermined correction rate;

c. making a reduction in the amount of cutting depth in accordance with the predetermined correction rate; and d. effecting unconditional stopping of the feed.

In a cutting operation by the use of a cutting tool having a single point tip, the main cutting force is represented by the cutting section area, i.e., (=chip width × chip thickness). Therefore, the aforesaid conditions (a), (b) and (c) may be met after all by altering the cutting section area. It should be understood, however, that an attempt of increasing the depth of cut hastily on the mere ground that an excessively small cutting force has been detected would be against the object of obtaining a required shape of the work processed, and thus, such an alteration of program is not adopted.

Also, when a cutting is performed at a reduced rate of cutting depth, a required shape of work can be obtained by the repetition of performances of either the relating particular command block or the entire original reference program.

The driving unit 104 which constitutes the fourth means comprises — in the instant embodiment — a saddle 139 which is fed by a Z-axis pulse motor 142 and a feed screw 137 connected thereto, and a slide 140 which is fed by a X-axis pulse motor 136 and a feed screw 138 connected thereto. The operation of this embodiment is described as follows:

The tip of the cutting tool 117 which is attached to the tool holder 141 is moved so as to follow the programmed tool path by aforesaid driving unit 104.

Figure 12:
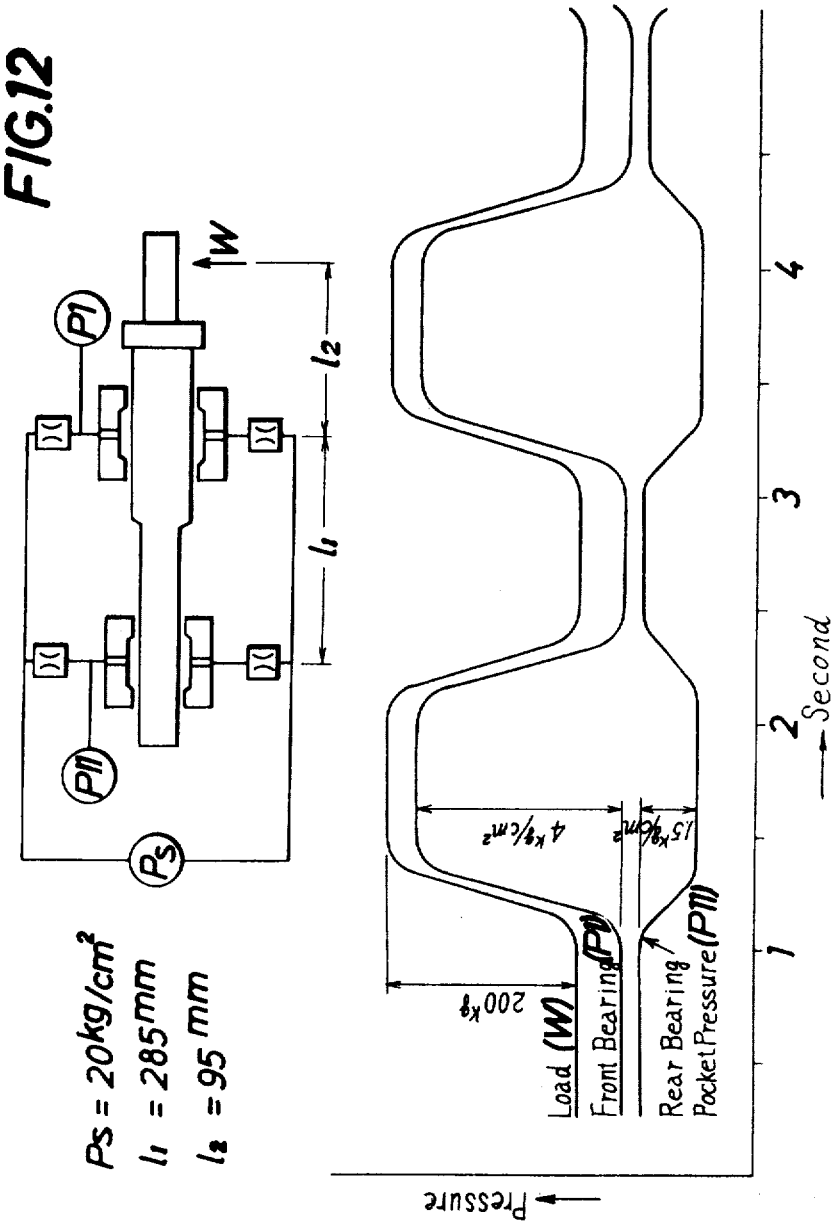
FIG. 12 is a chart, showing the result of an experiment in which the variation of a pocket pressure due to changes in the load applied to the hydrostatic bearing of the third embodiment is measured by a mechano-electric transducer. The abscissa represents time by second, and the ordinate represents pressure.

The result of observation, by the use of an electro-magnetic oscillograph, of the variation of the pocket pressures of the hydrostatic bearing in accordance with the changes in the force applied to the forward end of the spindle is shown in FIG. 12.

There is observed a variation of the upper and the lower pocket pressures under the conditions that the diameter of the spindle is 60 mm and a load of 200 kg is applied intermittently thereto at a distance of 95 mm from the front bearing.

The pressure from the oil pressure source is 20 kg/cm$^2$, and the orifices are fixed orifices which are each prepared by the use of a spool provided with linear grooves.

The mechano-electric transducer element employed comprises a semiconductor enclosed in the pressure chamber to utilize the changes occurring in resistance due to piezzo resistance effect.

As is clear from this observation, it will be understood that the variation of the force of action can be recognized with a very high sensitivity, faithfulness and responsiveness.

As has been stated above, according to the present embodiment, it is possible to improve the cutting efficiency by either increasing or decreasing the cutting section area in immediate response to an unexpected abnormality encountered in respect of the cutting depth or the hardness of the work being processed. Also, it is possible to prevent an overload of both the machine tool as well as the cutting tool.

These features of this embodiment, on the other hand, provide great advantages including simplification of programming and reduction of the operators' labor of watching and making judgement.

Also, the instant embodiment minimizes the provision of detectors for the spindle and the cutting tool themselves and minimizes the necessity of making particular modifications of these members. Thus, it has a further merit that the present invention can be practiced with a great easiness.

I claim:

1. A numerically controlled machine tool having adaptive control mechanism, comprising:

hydrostatic bearing of the type that its pocket pressures vary in accordance with the intensity of the cutting force, numerical control means capable of generating and delivering the command signals both the tool path and the feed rate in accordance with a pre-arranged reference program, driving means for driving the processing tool so as to follow said tool path in accordance with said command signals received from said numerical control means, means for detecting the said pressures of pockets of said hydrostatic bearing and for converting them to an electric output, computing means for performing computation of the detected electric output in accordance with predetermined computation formulas and for comparing the results of this computation with a predetermined reference and for generating a reference program correction command signal, and means provided in said numerical control means for re-programming the contents of the reference program in accordance with a predetermined procedure upon receipt of said correction command signal and for driving said driving means in accordance with said re-programmed program.

2. A numerically controlled machine tool having adaptive control mechanism according to claim 1, in which:

said pockets are of the recessed type formed in the slide face of a slidable feed table guided by guide ways of a bed, said recessed pockets communicate via their orifices to a hydraulic pressure source to hydrostatically support said feed table, and said means for detecting the pocket pressures are mechano-electric transducers operatively connected to said pockets to detect the cutting force acting onto said feed table as an electric output.

3. A numerically controlled machine tool having adaptive control mechanism according to claim 1, in which said machine tool is of the type having a spindle for driving a work, a cutting tool holder having a single-tipped cutting tool securely mounted thereto, a longitudinal saddle capable of sliding on a bed, a cross-slide capable of sliding on said longitudinal saddle and said cutting tool holder securely mounted thereto, driving means for driving said longitudinal saddle and cross-slide, respectively, and numerical control means capable of generating delivering the command signal representing the tool path and the feed rate in accordance with reference program, wherein:

said pockets are of the recessed type formed in the slide face of the cross-slide, said pockets communicate via their orifices to a hydraulic pressure source to provide a hydrostatic bearing, said means for detecting the pocket pressures are mechano-electric transducer operatively connected with said pockets to detect the cutting force acting onto said cross-slide as an electric output, said computing means performs a predetermined arithmetic comparison of this output to judge the adequacy of the cutting condition and generates, whenever necessary, a program correction command signal, and said means for self re-programming performs the re-programming of the contents of the reference program in accordance with said correction signal to alter the cutting section area or effect an emergency stop of feed.

4. A numerically controlled machine tool having adaptive control mechanism comprising:

a work driving spindle, a hydrostatic bearing supporting said spindle, means for converting the pressures of pockets formed in said hydrostatic bearing to an electric output, driving means for feeding the cutting tool, numerical control means for controlling said driving means in accordance with the command representing a numerical control program, means for detecting by virtue of the pocket pressures the cutting force acting upon said spindle, means for performing arithmetic computation of the result of said detection and being capable of comparing it with the reference limits and judging the adequacy of the cutting condition based on the result of said comparison and generating, whenever necessary, a reference program correction command signal, means provided in said numerical control means for self reprogramming the contents of the reference program in accordance with a predetermined procedure upon receipt of said correction command signal and for driving said driving means in accordance with said reprogrammed program to alter the cutting section area or effect an emergency stop of feed.

5. A numerically controlled machine tool having adaptive control mechanism according to claim 1, in which:

said hydrostatic bearing is of the type that it has recessed pockets formed in the bearing body, said pockets communicate via their orifices to a hydraulic pressure source, the pressurized oil discharged from said pockets is allowed to pass through a gap defined by said bearing body and the surface of the object to be supported by said bearing, a discharge groove is formed adjacent to each pocket but in communicating relation therewith to receive the pressurized oil from said pocket, and a pressurized gas passageway is provided between said discharge groove and the external edge of the bearing and communicates with a pressurized gas source to prevent the leakage of the pressurized oil to the outside of the hydrostatic bearing system.

* * * * *